United States Patent [19]

Webb et al.

[11] Patent Number: 4,614,899
[45] Date of Patent: Sep. 30, 1986

[54] VOLTAGE REGULATOR FOR PULSED VOLTAGE POWER SUPPLIES

[75] Inventors: Richard C. Webb; James R. Webb, both of Boulder, Colo.

[73] Assignee: Data Ray Corporation, Broomfield, Colo.

[21] Appl. No.: 512,152

[22] Filed: Jul. 8, 1983

[51] Int. Cl.[4] ........................ H01J 29/70; G05F 1/140
[52] U.S. Cl. .................................... 315/411; 315/387; 323/287
[58] Field of Search ....................... 315/411, 408, 387; 323/285, 287

[56] References Cited

U.S. PATENT DOCUMENTS 3,803,446  4/1976  Faglioni ............................... 315/387
4,298,829  11/1981  Luz ...................................... 315/411

OTHER PUBLICATIONS

Schade, Magnetic-Deflection Circuits for Cathode Ray Tubes, R.C.A. Rev., VIII, No. 3, p. 506, Sep. 1947.
Friend, Television Deflection Circuits, RCA Revision, Mar., 1947, p. 98 (condensed in *Television*, vol. V, p. 170).

*Primary Examiner*—Thomas H. Tarcza
*Assistant Examiner*—Gregory C. Issing
*Attorney, Agent, or Firm*—Robert C. Dorr

[57] ABSTRACT

A voltage regulator for flyback-type high voltage supplies having a supplementary energy storage transformer with its secondary interconnected in series with the primary of the conventional flyback transformer, a control circuit for sensing (a) the generation of the conventional flyback pulse, (b) a reference voltage, and (c) a feedback voltage signal appearing at the output of the conventional flyback transformer and a switch for selectively applying energy to the primary of the supplemental energy storage transformer. The aforesaid switch being activated whenever the feedback voltage is less than the reference voltage and said switch being activated earlier in time as the aforesaid difference becomes greater. Just after the occurrence of the flyback pulse, the switch is opened to permit energy in the energy storage transformer to be placed on the primary of the flyback transformer so that it is added with the flyback pulse to maintain the resultant voltage at the output of the secondary conventional flyback transformer at a regulated value.

11 Claims, 4 Drawing Figures

VOLTAGE REGULATOR FOR PULSED VOLTAGE POWER SUPPLIES

TECHNICAL FIELD

The present invention relates to voltage regulators for pulsed voltage power supplies and, in particular, to voltage regulators for flyback-type high voltage supplies adapted for use in cathode ray displays.

BACKGROUND ART

Cathode ray tubes (CRTs) are the most widely used electro-optic image transducers ever devised. Their major usage began with the introduction of television news and entertainment broadcasting and has now spread into all systems of visual image presentation information displays and computer data readout.

In contrast with electrostatically deflected cathode ray tubes which are employed in oscillographic instrument displays, the more common television type line-by-line (raster) screens are generated by rapid movement of the information modulated electron beam by means of magnetic fields introduced by coils mounted externally on the neck of the tube. An accelerating voltage of several thousand volts assures projection of the electron beam onto the phosphor coated screen with sufficient energy to cause it to write with a brilliant glow.

The art of electromagnetic deflection of cathode ray beams is well described in an early disclosure of Otto Schade wherein crossed magnetic fields are produced by current flow in inductors positioned on opposite sides of the CRT neck. Schade, Magnetic-Deflection Circuits for Cathode-Ray Tubes, RCA Rev., VIII, No. 3, P506, September 1947. These "deflection coils" apply motor forces to the electron stream thereby causing it to be deflected so that its point of termination on the phosphor screen surface appears as a line trace due to the pesistence of vision of the observer. When the beam is deflected according to an orderly procedure of movement such as from left to right across the screen starting at the upper left and proceeding downward, a rectangular patch is recorded for the viewer's visual retention. If this procedure is repeated often enough the illusion of continued presence of such an image field is created. Variations in the intensity of the electron beam as it moves repeatedly through such a scanned raster register in the eye and mind of the viewer as recognizable geometric images.

It is common practice to move the electron beam across the screen at a uniform velocity both in the direction of the rapid line scan (generally horizontal) as well as in the slower field scanning direction. Linearly variant current ramps are applied to the deflecting coils on the neck of the tube to accomplish this. Each current ramp terminates as the electron beam reaches its extreme position and then reverses direction quickly causing the beam to return to its starting point. In order to support the illusion of continued image presence without tell-tale flicker becoming apparent, it is necessary to refresh the entire image at least fifty or sixty times per second. When a fine structure of many hundred scanning lines are to be included in the display so as to provide good image resolution, the line scanning rate may need to be as high as one hundred thousand sweeps per second although it is standard practice to use only about sixteen thousand for broadcast television purposes.

The cathode ray beam accelerating voltage (second anode voltage) employed in modern equipment ranges from twelve to twenty-five kilovolts depending upon screen size and the desired brightness level of the image generated. The current requirement imposed upon this high voltage source may range from fifty or one hundred microamps for monochrome screens to one or two milliamperes for color cathode ray tubes. The high voltage source itself can be any available type of power generator provided it can support the current demand of the CRT and has an upper current limit of a few milliamperes beyond which the voltage collapses so as to protect servicing personnel from instant electrocution should they make accidental contact therewith.

Early in the development of television broadcasting a unique type of second anode voltage supply for magnetically deflected cathode ray tubes was described by A. W. Friend and later improved upon by many others. Fried, Television Deflection Circuits, RCA Rev., March, 1947 p. 98 (condensed in *Television*, Vol. V, pg. 170). This very simple and inexpensive high voltage power supply system is a supplement to the magnetic beam deflection technique described above and makes use of the rapid current reversal which occurs in the line sweep deflection coil. This reversal rapidly and repeatedly returns the electron beam to its start of sweep position. It turns out moveover that whenever an electric current changes value rapidly while flowing in an inductor such as a deflecting coil it creates a substantial voltage across the terminals of the coil by self induction. The relationship between an inductor of some value, L (Henrys), the voltage E across it, and the rate of change of current flowing in it (di/dt) (amps per second) is exposed as $E = -L\, di/dt$. Thus a brief voltage pulse reaching several hundred volts in magnitude is generated on the terminals of the deflection coil as it causes "flyback" of the CRT beam, line-by-line.

As a source of voltage, this "flyback" pulse found on the deflection coil terminals is powerful and can stand heavy loading due to the low internal impedance of the deflection coil system. It is only necessary therefore to "step up" this voltage by means of a transformer. The several hundred volt level of the deflection coil can thus be raised to the several thousand volt (rectified dc) level required to supply second anode voltage for the tube.

In this manner a low cost combination line deflection and high voltage generator has been developed for use with cathode ray tubes. Fortunately the system has its own current limitations which render it safe to servicing personnel. The flyback high voltage system has reached almost universal acceptance in all forms of commercial cathode ray display devices in spite of one important limitation. The latter being a visible geometric expansion of the raster area as screen brightness is increased. This defect is due to falling second anode voltage or poor high voltage regulation. This effect is now considered totally unacceptable for such critical display systems as ultrasonic medical imagery, word processing business machines, computer aided design screens, and other systems which are sensitive to exactness of image size.

The term voltage regulation is defined as the ratio of the change in a power supply's voltage before and after current loading is applied to it expressed as a percentage. It was known from the beginning that a "flyback" type high voltage power supply would have rather poor voltage regulation, typically ten to fifteen percent. This was thought to be satisfactory however for entertainment television display purposes; in view of its simplicity, low cost and the safety features of this system.

The lack of good voltage regulation in the flyback-type high voltage described above is due to the inherently high internal source impedance of the step up transformer and pulse rectifying arrangement. The system operates in a completely open loop manner, and generally lacks the benefit of any current preload. Many prior art attempts have been made to stabilize the voltage of these power supplies, most of which are tabulated below:

1. The use of a high voltage shunt thyristor (for example a Zener diode) to load the supply until an external load is applied thereby holding a fixed threshold voltage level. This approach wastes power and heats up the thyristor which leads to early destruction.

2. The use of a vacuum tube shunt regulator with or without voltage feedback loop control. This approach is also a power waster because the tube heater must also be activated. However, the components exhibit longer life.

3. The use of an adjustable flyback interval under feedback loop control using either inductive or capacitive tuning means to control flyback voltage. Such a technique requires complex adjustment and the variable tuning is generally visible on the screen.

4. The use of a separate flyback high voltage supply section independent of the deflection yoke section with an adjustable dc voltage source under loop feedback control. Although this is successful and is widely used, it is expensive and power inefficient due to near duplication of components.

5. The use of a supplementary adjustable dc source added to the high voltage winding to offset internal drop as it occurs. This also requires a large number of additional components and power is inefficient.

Finally, while the above problem is characteristic of flyback-type high voltage power supplies it is symptomatic of all pulsed voltage power supplies.

DISCLOSURE OF INVENTION

The problem faced in designing a regulator for pulsed voltage power supplies, such as flyback-type high voltage supplies, is to provide an inexpensive highly power efficient circuit that provides excellent regulation for the output voltage.

In order to solve the above problem, the present invention uses a feedback circuit wherein a sample of the high voltage output is compared to a reference voltage and dependent upon the difference between the two voltages additional voltage is added to the input of the flyback transformer in order to maintain the output voltage at a desired level.

Under the teachings of the present invention the secondary of an energy storage transformer is interconnected with the primary of the flyback transformer of the supply and based upon the voltage difference a switch is closed to provide additional voltage to the primary of the energy storage transformer to maintain the output voltage at the desired level. An earlier closing of the switch increases the voltage added and a later closing decreases the voltage added.

DISCLOSURE OF THE PREFERRED EMBODIMENT

1. Prior Art

Figure 1:
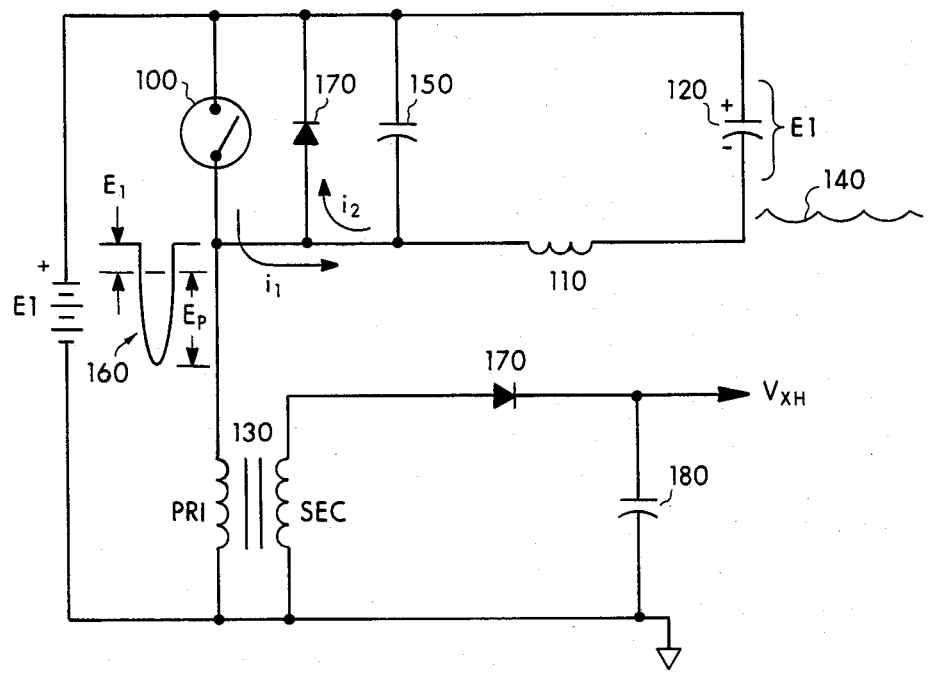
FIG. 1 is a schematic of a prior art flyback-type high voltage power supply.
Figure 2:
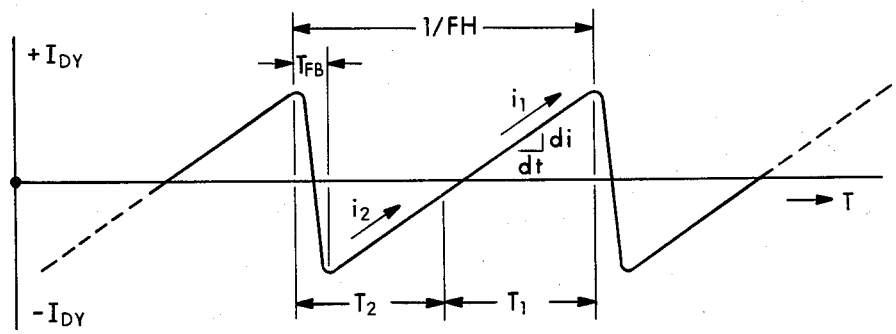
FIG. 2 is a graph showing the current waveform for the current through the deflection yoke contained in the prior art circuit of FIG. 1.

FIG. 1 sets forth the schematic of a prior art circuit for flyback-type high voltage power supply in which an electronic switch 100 is responsible for creating an intermittent path for current between voltage source E1 and a deflection coil 110. Switch 100 is closed for a little less than one half of each sweep cycle and switching cycles occur at the line sweep frequency $F_H$ thus creating the current waveform $I_{DY}$ which flows in the deflection yoke 100 as shown in FIG. 2.

When switch 100 is open a path for current to charge capacitor 120 from source E1 via deflection yoke 110 and the primary winding, PR1, of the flyback transformer 130 is provided. Capacitor 120 is large and takes on a voltage charge equal to approximately E1. This voltage is maintained on capacitor 120 since the capacitor is alternately charged and discharged by equal currents in and out of deflection yoke 110 by action of switch 100 as shown by waveform 140.

Upon closure of switch 100 the voltage on capacitor 120 is impressed upon deflection yoke 110 and current, $i_1$, flows in accordance with $E = -L(di/dt)$ where E is now E1.

Upon opening switch 100 the energy stored inductively on deflection yoke 110 finds a path into capacitor 150 which is conventionally called the flyback tuning capacitor. At this time one undamped half-sinusoidal voltage pulse, $E_P$, as shown by waveform 160, is created, during time $T_{FB}$ of the sweep cycle, as the current reverses direction of flow and emerges as $i_2$ now flowing linearly outward from deflection yoke 110 via damper diode 170 and back into the capacitor 120 thereby partially recharging it. The duration of this undamped "flyback" pulse is determined by the inductance and capacitance values involved. In the preferred prior art embodiment, the following values are used:

Capacitor 120 = 2.2 microfarads (250 v)
Capacitor 150 = 5600 picofarads (1500 v)
Capacitor 180 = 500 picofarads (30 kilovolts)
Yoke 110 = 250 microhenrys The remaining components are also conventionally available as:

Diode 170 = RAB-100 (1000 v, 2 amp, 100 nano second) (Electronic Devices, Inc.)
Flyback Transformer 130 = HITACHI Model No. 2432831BD24M Switching Transistor 100 = MJ-12005 (Motorola)

Both in the case of $i_1$ as well as $i_2$ the time slopes di/dt are positive, constant and essentially equal since the deflection coil has essentially the same voltage (E1) across its terminals during the time when current flows into it as well as when current flows out of it. The voltage on capacitor 120 slightly changes due to its having equal currents flowing into and out of it, as shown by wave 140. Thus the deflection yoke 110 generates a linearly varying magnetic field which can deflect the CRT beam equally to either side of its freefall center position as there is no net DC component of current in it.

The primary flyback voltage pulse, $E_P$, as shown in waveform 160, will have a peak value from a few hundred volts to more than 1000 volts depending upon the sweep system design. The flyback transformer 130 is arranged to receive this flyback pulse, $E_P$, across its primary winding, PRI. The inductance of the primary winding is chosen to be from five to ten times larger than the inductance of the deflection yoke 110 so that little interference occurs with the operation of the deflection system. Furthermore, the flyback transformer 130 extracts only a relatively small fraction of the energy available in each flyback pulse, $E_P$, which it converts by turns ratio transformation into a much larger pulse, $E_{SP}$. This latter secondary pulse is then rectified by diode 170 and filtered by capacitor 180 to become the desired second anode voltage, $V_{XH}$, necessary to energize the cathode ray tube. The magnitude of the voltage pulse $E_{SP}$ is unregulated and, therefore, the voltage at the output of the supply is unregulated.

It is to be expressly understood that the circuitry of FIG. 1 is conventional and that the aforesaid component values are well known in the industry. The present invention described next, provides additional circuitry to this prior art approach.

2. The Present Invention

Figure 3:
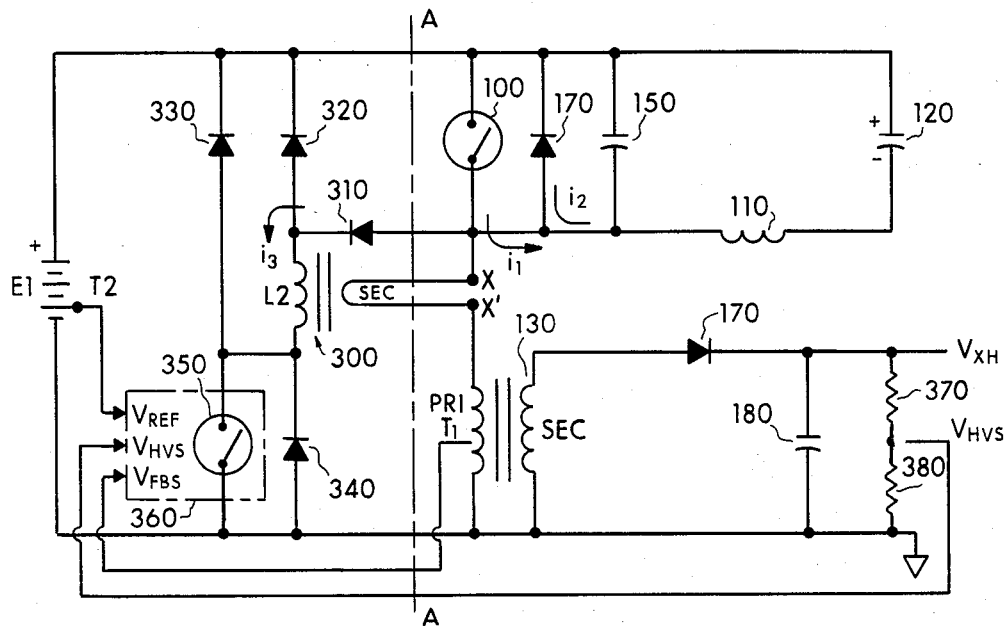
FIG. 3 is a schematic of the voltage regulation circuit of the present invention.

The schematic shown in FIG. 3 is identical to the circuit of FIG. 1, part by part, but further includes the addition of a supplementary energy storage transformer 300, a steering diode 310, voltage limit diodes 320, 330, and 340, an auxiliary switch 350 with its controlling circuitry 360 and the high voltage sampling resistor assembly 370 and 380 of the present invention. These items are mostly located to the left of dividing line A—A.

Control circuit 360 receives the line sweep timing information, $V_{FBS}$, by means of a sample of the flyback pulse 160 taken from tap point T1 on the primary PRI of the flyback transformer 130. It is also furnished with a fixed reference dc voltage $V_{REF}$ (for example ten volts) taken from tap point T2 on the voltage source E1.

The control circuit 360 serves to compare a high voltage sample $V_{HVS}$ fed back from high voltage point $V_{XH}$ located at the output of the supply via a resistor divider assembly 370 and 380 and said fixed reference voltage $V_{REF}$ so as to close and open an auxiliary switch 350 at appropriate times and thus achieve control of the D.C. high voltage $V_{XH}$ as will be further explained below. A representative control circuit 360 that can be used is commercially available from: Silicon General, Garden Grove, Calif., as Part No. 3525A. It is to be expressly understood that other feedback control circuits may be used according to the teachings of the present invention.

Auxiliary switch 350 can be closed by the control circuit 360 at any point in the sweep cycle shown in FIG. 2. The main switch 100 being closed during a large part of this period provides a patch for current from E1 via diode 310 into primary inductance L2 of energy storage transformer 300. Upon closure of switch 350 a current $I_3$ of FIG. 3 begins to flow and to increase linearly toward some terminal value which it will have at the time the main sweep control switch 100 is opened and the flyback pulse $E_P$ initiated. The energy stored on L2 of transformer 300 at that time will be proportional to the product of its inductance value and the square of the peak current amplitude reached. Thus the stored energy level in transformer 300 increases very rapidly as switch 350 is closed earlier in the sweep cycle. Switch 350 opens at a time slightly later than switch 100 thereby necessitating the sensing of the generation of the flyback pulse 160 at pick-off point T1 and feeding back this timing signal as $V_{FBS}$.

Figure 4:
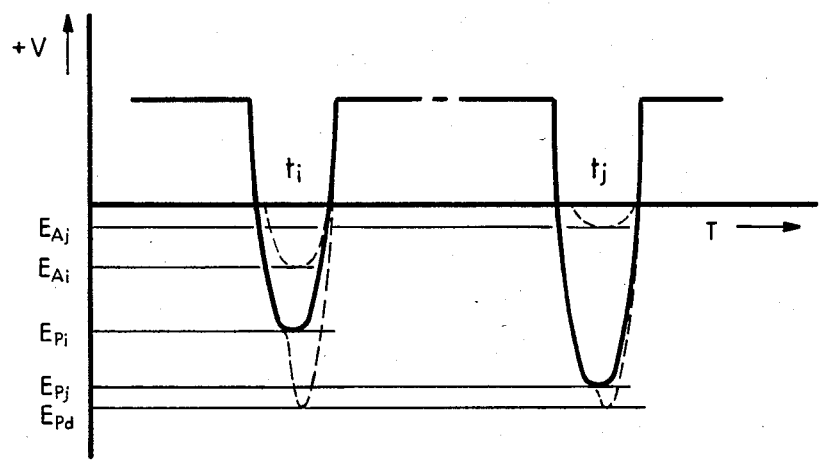
FIG. 4 is a graph showing the application of an additional voltage to the primary of the flyback transformer under the teachings of the present invention.

Whatever energy that may be present on L2 of transformer 300 when the switch 350 is opened joins with the energy in the flyback pulse $E_P$ to produce a combined flyback pulse $E_{PD}$ having a larger voltage level as shown in FIG. 4. The energy $E_A$ from the energy storage transformer 300 flowing through its secondary winding, SEC, is added as a voltage pulse directly to the natural flyback pulse $E_P$, of the deflection coil system supplementing it in driving the primary, PRI, of the high voltage transformer 130. The final rectified D.C. voltage, $V_{XH}$, from the secondary of the flyback transformer 130 is therefore placed directly under control of the time position at which switch 350 is closed.

The voltage control loop of the present invention shown in FIG. 3 consists of the voltage divider network, resistor 370 and resistor 380, which furnishes a fraction of the second anode voltage $V_{XH}$ as a feedback voltage $V_{HVS}$ for comparison with the fixed reference dc voltage $V_{REF}$. Whenever $V_{HVS}$ becomes smaller than $V_{REF}$ the control circuit advances the closure time for switch 350 to a point earlier in the sweep cycle thereby increasing the energy $E_A$ on L2 of the energy storage transformer 300 raising the resulting voltage in the combined pulse to a higher level of $E_{PD}$. Whenever the reverse situation occurs the energy $E_A$ on L2 of transformer 300 is lowered by delaying the closure time for switch 350 to a point later in the sweep cycle to lower the energy $E_A$ on L2 and, therefore, to adjust the size of the combined flyback pulse to such a value of $E_{PD}$ as will maintain the difference between the feedback voltage $V_{HVS}$ and the reference voltage $V_{REF}$ at nearly zero (i.e. $V_{HVS}$ being substantially equal to $V_{REF}$). In this manner full and complete control of second anode D.C. voltage $V_{XH}$ in a closed loop feedback system is achieved.

The present invention provides an additional or supplemental energy pulse, $E_A$, which is additive to the next conventionally generated voltage pulse $E_P$. The magnitude of the additional energy pulse, $E_A$, during a particular time period is controlled by the aforesaid feedback loop to bring the combined pulse always to the desired level of $E_{PD}$. Under the teachings of the present invention, the voltage pulse, $E_P$, supplies more than fifty percent of the power to the combined pulse $E_{PD}$ and the additive or control pulse $E_A$ supplies the remaining power to always bring the voltage pulse $E_{PD}$ (whether the point of reference is at the primary or secondary of transformer 130) up to maintain the desired rectified D.C. output voltage.

As shown in FIG. 4 and discussed in the Background Art section, the voltage pulse, $E_P$, generated by the conventional circuit of FIG. 1 or by any other pulsed voltage power supply may be unregulated or variable over time in addition to varying with the load being driven. For example, during time $T_i$, the voltage pulse $E_{Pi}$, is less than the voltage pulse $E_{Pj}$ which occurs during time $T_j$ due to the unregulated nature of the power supply. Both voltage pulses $E_{Pi}$ and $E_{Pj}$, in this example, are less than the desired output pulse $E_{PD}$. The variation in output power of the supply occurs over the generation of many pulses $E_P$ and, therefore, the times $T_i$ and $T_j$ are separated in time.

In FIG. 4, the additive pulse $E_{Ai}$ at time $T_i$ is greater in magnitude than the magnitude of additive pulse $E_{Aj}$ at time $T_j$ to regulate the varying nature of the voltage pulse $E_P$, and, thus, to achieve regulation. Therefore, switch 350, under control of circuit 360, closes earlier in the sweep cycle to permit more energy to build up in the primary L2 of transformer 300 to create pulse $E_{Ai}$ and it closes later in the sweep cycle to lessen the energy buildup to create pulse $E_{Aj}$.

It is to be understood in the preferred embodiment, that the voltage, $V_{HVS}$, is based upon the transformation (if any) and rectification of the flyback pulses $E_{PD}$. Under the teachings of the present invention, the feedback voltage need only produce a signal proportional to the voltage pulse $E_{PD}$ and, therefore, the invention is not dependent on the particular output circuitry (130, 170 and 180) of the supply.

In the preferred embodiment, the following component values are used:

Diode 310 = RC-100
Diode 320 = RC-100
Diode 330 = IN4935
Diode 340 = IN4935
Switch 350 = MPSU07 (Motorola)
Transformer 300 = (Coil Craft-DR 701-560-011) (Primary 12 millihenrys and secondary 78 microhenrys)

Although an energy storage transformer 300 is used to apply the additional energy pulse $E_A$ to voltage pulse $E_P$, other conventional coupling devices could be utilized since under the teachings of the present invention the goal is to supplement the unregulated primary voltage pulse ($E_P$) (i.e., greater than 50% of voltage $E_{PD}$) with a voltage pulse ($E_A$) (i.e., less than 50% of voltage $E_{PD}$) applied to be additive, time wise, therewith. And, while a preferred form of the present invention has been set forth in the drawings, adapted for use in flyback-type high voltage supplies, it is to be expressly understood that the teachings of the present invention can be modified to include other pulsed voltage supplies such as switched power supplies and that modifications and changes may be made to the structure and yet still under the teachings of the present invention as set forth in the claims.

We claim:

1. A voltage regulator for a pulsed voltage power supply, said supply being capable of generating a series of ($V_{XH}$) voltage pulses ($E_P$) to produce an unregulated voltage at the output of said supply, said voltage regulator comprising:
   first means (370, 380) connected to the output of said supply for producing voltage feedback signals ($V_{HVS}$) proportional to the magnitude of said output voltage ($V_{XH}$),
   second means (T1) receptive to said voltage pulses ($E_P$) for producing timing signals ($V_{FBS}$) corresponding to the time for generation of each said voltage pulses ($E_P$),
   third means (T2) for producing a reference voltage ($V_{REF}$), and
   means (300, 350, 360) receptive of said voltage feedback signals ($V_{HVS}$) from said first producing means, of said timing signals ($V_{FBS}$) from said second producing means, and of said reference voltage ($V_{REF}$) from said third producing means for applying sufficient additional voltage ($E_A$) during said generation time of each of said voltage pulses ($E_P$) in order to maintain the voltage feedback signal ($V_{HVS}$) substantially equal to the reference voltage ($V_{REF}$) thereby maintaining the combined voltage pulses ($E_P$ and $E_A$) near a regulated level ($E_{PD}$).

2. The voltage regulator of claim 1 wherein said additional voltage ($E_A$) applied by said applying means (300, 350, 360) is less than fifty percent in magnitude of said combined voltage pulse ($E_{PD}$).

3. The voltage regulator of claim 2 wherein said applying means (300, 350, 360) further comprises:
   an energy storage transformer (300) having its secondary interconnected with said supply so as to be able to add energy to said voltage pulses ($E_P$), and
   means (350, 360) operatively interconnected to the primary of said energy storage transformer (300) and receptive of said voltage feedback signals ($V_{HVS}$), of said timing signals ($V_{FBS}$) and of said reference voltage ($V_{REF}$) for providing sufficient voltage on said primary of said energy storage transformer (300) in order for said secondary to apply said additional voltage ($E_A$).

4. The voltage regulator of claim 3 wherein said providing means (350, 360) further comprises:
   a switch (350) connected to said primary of said energy storage transformer (300) for selectively applying said energy to the aforesaid primary, and
   a control circuit (360) receptive of said voltage feedback signals ($V_{HVS}$), of said timing signals ($V_{FBS}$), and of said reference voltage ($V_{REF}$) for selectively activating said switch, at a point in time before the generation of each of said voltage pulses ($E_P$), said control circuit (360) being capable of activating said switch (350) earlier in time when a greater difference between the reference voltage ($V_{REF}$) and the voltage feedback signal ($V_{HVS}$) exists in order to increase the amount of energy stored in said energy storage transformer (300) and said control circuit (360) being capable of deactivating said switch (350) immediately after the start of the generation of said voltage pulse ($E_P$) in order to apply said additional voltage ($E_A$) to said voltage pulse ($E_P$).

5. A voltage regulator for a flyback-type voltage supply, said supply having a deflection yoke circuit (100, 170, 150, 120, and 110) connected to the primary of a flyback transformer (130), and said supply being capable of generating a series of unregulated voltage flyback pulses ($E_P$) at said primary in order to produce an unregulated voltage ($V_{XH}$) at the output of said supply, said voltage regulator comprising:
   first means (370, 380) connected to the secondary of said flyback transformer (130) for producing voltage feedback signals ($V_{HVS}$) proportional to the magnitude of said output voltage ($V_{XH}$),
   second means (T1) connected to said primary of said flyback transformer (130) for producing flyback timing signals ($V_{FBS}$) corresponding to the time for generation of each said flyback pulses ($E_P$),
   third means (T2) for producing a reference voltage ($V_{REF}$), and
   means (360, 300) operatively connected to the primary of said flyback transformer (130) and receptive of said voltage feedback signals ($V_{HVS}$) from said first producing means, of said flyback timing signals ($V_{FBS}$) from said second producing means, and of said reference voltage ($V_{REF}$) from said third producing means for applying sufficient additional voltage ($E_A$) during said generation time to the primary input of said flyback transformer (130) to maintain the voltage feedback signal ($V_{HVS}$) substantially equal to the reference voltage ($V_{REF}$) thereby maintaining the combined voltage pulses ($E_P$ and $E_A$) near a regulated level ($E_{PD}$).

6. A voltage regulator for a flyback-type voltage supply, and said supply having a deflection yoke circuit (100, 170, 150, 120, and 110) connected to the primary of a flyback transformer (130), and said supply being capable of generating a series of voltage flyback pulses ($E_P$) at said primary in order to produce an unregulated voltage ($V_{XH}$) at the output of said supply, said voltage regulator comprising:

first means (370, 380) connected to the secondary of said flyback transformer (130) for producing voltage feedback signals ($V_{HVS}$) proportional to the magnitude of said output voltage ($V_{XH}$), second means (T1) receptive of said flyback pulse ($E_P$) for producing flyback timing signals ($V_{FBS}$) corresponding to the time for generation of said flyback pulses, ($E_P$), third means (T2) for producing a reference voltage ($V_{REF}$), and means (360, 300) operatively connected to the primary of said flyback transformer (130) and receptive of said voltage feedback signals ($V_{HVS}$) from said first producing means, of said flyback timing signals ($V_{FBS}$) from said second producing means, and of said reference voltage ($V_{REF}$) from said third producing means for applying sufficient additional voltage ($E_A$) to each of said flyback pulses ($E_P$) in order to maintain the high voltage feedback signal ($V_{HVS}$) substantially equal to the reference voltage ($V_{REF}$).

7. A voltage regulator for a flyback-type voltage supply, said supply having a deflection yoke circuit (100, 170, 150, 120, and 110) connected to the primary of a flyback transformer (130) for generating a series of high voltage flyback pulses ($E_P$), said supply producing an unregulated output voltage ($V_{XH}$), said voltage regulator comprising:

an energy storage transformer (300) having its secondary interconnected in series with said primary of said flyback transformer (130), first means (370, 380) connected to said output of said supply for producing voltage feedback signals ($V_{HVS}$) proportional to the magnitude of each of said high voltage flyback pulses ($E_P$), second means (T1) receptive of said flyback pulse ($E_P$) for producing flyback timing signals ($V_{FBS}$) corresponding to the generation of said high voltage flyback pulses ($E_P$), third means (T2) for producing a reference voltage ($V_{REF}$), and means (360) receptive of said voltage feedback signals ($V_{HVS}$) from said first producing means, of said flyback timing signals ($V_{FBS}$) from said second producing means, and of said reference voltage ($V_{REF}$) from said third producing means for applying sufficient voltage ($E_A$) to the primary input of said energy storage transformer (300) during the generation of each said flyback pulse ($E_P$) to maintain the high voltage feedback signal ($V_{HVS}$) substantially equal to the reference voltage ($V_{REF}$) thereby maintaining the combined voltage pulses ($E_P$ and $E_A$) near a regulated level ($E_{PD}$), said flyback voltage pulse ($E_P$) being capable of supplying more than fifty percent of the magnitude of said regulated voltage pulse ($E_{PD}$).

8. A voltage regulator for a flyback-type high voltage supply, said supply having a deflection yoke circuit (100, 170, 150, 120, and 110) connected to the primary of a flyback transformer (130) for generating a series of flyback pulses ($E_P$) at the primary of said flyback transformer (130) in order to provide an unregulated output voltage ($V_{XH}$), said voltage regulator comprising:

an energy storage transformer (300) having its secondary interconnected in series with said primary of said flyback transformer (130), a switch (350) connected to the primary of said energy storage transformer (300) for selectively applying energy to the aforesaid primary, first means (370, 380) connected to said supply output for producing voltage feedback signals ($V_{HVS}$) proportional to the magnitude of said output voltage ($V_{XH}$), second means (T1) connected to said primary of said flyback transformer (130) for producing flyback timing signals ($V_{FBS}$) corresponding to the generation of said high voltage flyback pulses ($E_P$), third means (T2) for producing a reference voltage ($V_{REF}$), and a control circuit (360) receptive of said voltage feedback signals ($V_{HVS}$) from said first producing means, of said flyback timing signals ($V_{FBS}$), from said second producing means, and of said reference voltage ($V_{REF}$) from said third producing means for selectively activating said switch, at a point in time before the generation of each of said voltage flyback pulses ($E_P$), said control circuit (360) being capable of activating said switch (350) earlier in time to the generation of said voltage flyback pulse ($E_P$) when a greater difference between the reference voltage ($V_{REF}$) and the high voltage feedback signal ($V_{HVS}$) exists in order to increase the amount of energy stored in said energy storage transformer (300) so that the addition of said applied energy ($E_A$) to said flyback pulse ($E_P$) causes the aforesaid difference to be nearly zero and said control circuit (360) being further capable of deactivating said switch (350) immediately after the start of the generation of said flyback pulse ($E_P$) in order to apply said additional voltage ($E_A$) to said primary of said flyback transformer (130).

9. The voltage regulator of claim 8 wherein said first producing means comprises a resistive voltage divider network (370, 380) connected across said secondary of said flyback transformer (130), said resistive voltage divider having an electrical connection from a predetermined point ($V_{VHS}$) on said divider to said control circuit.

10. A voltage regulator for a flyback-type voltage supply, said supply having a deflection yoke circuit (100, 170, 150, 120, and 110) connected to the primary of a flyback transformer (130) for generating a series of flyback pulses ($E_P$) in order to provide an unregulated output voltage ($V_{XH}$) at the secondary of said flyback transformer, said voltage regulator comprising:

means (300 and 350) connected to the primary of said flyback transformer (130) for selectively applying energy to the primary of said flyback transformer (130), first means (370, 380) connected to the secondary of said flyback transformer (130) for producing feedback signals ($V_{HVS}$) proportional to the magnitude of each of said flyback pulses, ($E_P$), second means (T1) receptive of said flyback pulses ($E_P$) for producing flyback timing signals ($V_{FBS}$) corresponding to the generation of each of said flyback pulses ($E_P$), third means (T2) for producing a reference voltage ($V_{REF}$), and a control circuit (360) receptive of said feedback signals ($V_{HVS}$) from said first producing means, of said flyback timing signals ($V_{FBS}$) from said second producing means, and of said reference voltage ($V_{REF}$) from said third producing means for selectively activating said applying means before the generation of each of said voltage flyback pulses ($E_P$), said control circuit (360) being capable of activating said applying means (300 and 350) earlier in time when a greater difference between the reference voltage ($V_{REF}$) and the feedback signal ($V_{HVS}$) exists in order to increase the amount of energy ($E_A$) applied to said primary so that the addition of said applied energy ($E_A$) to said flyback pulse ($E_P$) causes the aforesaid difference to be nearly zero and said second circuit (360) being further capable of deactivating said applying means (300 and 350) immediately after the start of the generation of said flyback pulse ($E_P$) in order to apply said additional voltage ($E_A$) to said primary of said flyback transformer (130).

11. A voltage regulator for a flyback-type high voltage supply, said supply having a deflection yoke circuit (100, 1770, 150, 120, and 110) connected to the primary of a flyback transformer (130) for generating a series of flyback pulses ($E_P$) in order to provide an unregulated output voltage ($V_{XH}$) at the secondary of said flyback transformer (130), said voltage regulator comprising:

an energy storage transformer (300) having its secondary interconnected in series with said primary of said flyback transformer (130), first means (370, 380) connected to said secondary of said flyback transformer (130) for producing voltage feedback signals ($V_{HVS}$) proportional to the magnitude of each of said high voltage flyback pulses ($E_P$), second means (T1 connected to said primary of said flyback transformer (130) for producing flyback timing signals ($V_{FBS}$) corresponding to the generation of said high voltage flyback pulses ($E_P$), third means (T2) for producing a reference voltage ($V_{REF}$), and means (360) receptive of said high voltage feedback signals ($V_{HVS}$) from said first producing means, of said flyback timing signals ($V_{FBS}$) from said second producing means, and of said reference voltage ($V_{REF}$) from said third producing means for applying sufficient voltage ($E_A$) to the primary input of said energy storage transformer (300) to maintain the high voltage feedback signal ($V_{HVS}$) substantially equal to the reference voltage ($V_{REF}$) for each of said high voltage flyback pulses ($E_P$) thereby maintaining the combined voltage pulses ($E_P$ and $E_A$) at a regulated level ($E_{PD}$).

* * * * *